United States Patent
Nishida et al.

(10) Patent No.: US 10,012,915 B2
(45) Date of Patent: Jul. 3, 2018

(54) ELECTROPHOTOGRAPHIC PHOTOSENSITIVE MEMBER, PROCESS CARTRIDGE AND ELECTROPHOTOGRAPHIC APPARATUS, AND CHLOROGALLIUM PHTHALOCYANINE CRYSTAL AND METHOD FOR PRODUCING THE SAME

(71) Applicant: CANON KABUSHIKI KAISHA, Tokyo (JP)

(72) Inventors: Tsutomu Nishida, Mishima (JP); Masato Tanaka, Utsunomiya (JP); Masataka Kawahara, Mishima (JP); Jumpei Kuno, Yokohama (JP); Kaname Watariguchi, Yokohama (JP); Hidetoshi Hirano, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/638,891

(22) Filed: Jun. 30, 2017

(65) Prior Publication Data

US 2017/0299970 A1    Oct. 19, 2017

Related U.S. Application Data

(62) Division of application No. 14/920,307, filed on Oct. 22, 2015, now abandoned.

(30) Foreign Application Priority Data

Oct. 29, 2014   (JP) ................................. 2014-220744

(51) Int. Cl.
| | |
|---|---|
| G03G 5/06 | (2006.01) |
| G03G 5/047 | (2006.01) |
| C30B 1/10 | (2006.01) |
| C09B 47/04 | (2006.01) |
| C30B 29/54 | (2006.01) |

(52) U.S. Cl.
CPC ........... G03G 5/047 (2013.01); C09B 47/045 (2013.01); C30B 1/10 (2013.01); C30B 29/54 (2013.01); G03G 5/0696 (2013.01)

(58) Field of Classification Search
CPC ...... G03G 5/043; G03G 5/047; G03G 5/0696; C09B 1/10
See application file for complete search history.

(56) References Cited

U.S. PATENT DOCUMENTS

| | | | |
|---|---|---|---|
| 5,759,729 A | 6/1998 | Martin et al. | |
| 9,746,790 B2 * | 8/2017 | Nishida | G03G 5/0696 |
| 2003/0013029 A1 | 1/2003 | Burt | |
| 2009/0068576 A1 | 3/2009 | Hongo | |

(Continued)

FOREIGN PATENT DOCUMENTS

| | | | |
|---|---|---|---|
| JP | 5194523 A | 8/1993 | |
| JP | 11172143 A | 6/1999 | |

(Continued)

Primary Examiner — Hoa V Le
(74) Attorney, Agent, or Firm — Canon U.S.A., Inc. IP Division (57) ABSTRACT

An electrophotographic photosensitive member includes a support and a photosensitive layer in this order. The photosensitive layer contains a chlorogallium phthalocyanine crystal obtained by mixing a hydroxygallium phthalocyanine crystal and an aqueous hydrochloric acid solution.

6 Claims, 4 Drawing Sheets

(56) References Cited

U.S. PATENT DOCUMENTS

| | | |
|---|---|---|
| 2010/0196817 A1 | 8/2010 | Sasaki |
| 2016/0124325 A1 | 5/2016 | Nishida |
| 2016/0124326 A1 | 5/2016 | Nishida |
| 2016/0124329 A1 | 5/2016 | Nishida |

FOREIGN PATENT DOCUMENTS

| | | |
|---|---|---|
| JP | 2000344778 A | 12/2000 |
| JP | 2005226013 A | 8/2005 |
| JP | 2005249964 A | 9/2005 |
| JP | 2009062475 A | 3/2009 |

* cited by examiner

ELECTROPHOTOGRAPHIC PHOTOSENSITIVE MEMBER, PROCESS CARTRIDGE AND ELECTROPHOTOGRAPHIC APPARATUS, AND CHLOROGALLIUM PHTHALOCYANINE CRYSTAL AND METHOD FOR PRODUCING THE SAME

CROSS-REFERENCE TO RELATED APPLICATIONS

This application is a divisional of U.S. patent application Ser. No. 14/920,307, filed Oct. 22, 2015, which claims the benefit of Japanese Patent Application No. 2014-220744, filed Oct. 29, 2014, all of which is hereby incorporated by reference herein in its entirety.

BACKGROUND OF THE INVENTION

Field of the Invention

The present invention relates to an electrophotographic photosensitive member, a process cartridge and an electrophotographic apparatus that use the electrophotographic photosensitive member, and a chlorogallium phthalocyanine crystal and a method for producing the chlorogallium phthalocyanine crystal.

Description of the Related Art

Phthalocyanine pigments having an excellent function as a photoconductor are used as materials for electrophotographic photosensitive members, solar batteries, sensors, switching elements, and the like. It is known that such phthalocyanine pigments exhibit different sensitivity characteristics not only in the case where the crystal forms are different but also in the case where the formation processes of crystals are different.

Japanese Patent Laid-Open No. 2000-344778 discloses a method for producing a hydroxygallium phthalocyanine crystal having high sensitivity by performing an acid pasting treatment on a gallium phthalocyanine crystal. Japanese Patent Laid-Open No. 11-172143 discloses an iodogallium phthalocyanine crystal obtained by treating a chlorogallium phthalocyanine crystal or a hydroxygallium phthalocyanine crystal with hydriodic acid.

SUMMARY OF THE INVENTION

The present invention provides an electrophotographic photosensitive member having high sensitivity, a process cartridge and an electrophotographic apparatus that use the electrophotographic photosensitive member, and a chlorogallium phthalocyanine crystal having high sensitivity and a method for producing the chlorogallium phthalocyanine crystal.

Further features of the present invention will become apparent from the following description of exemplary embodiments with reference to the attached drawings.

DESCRIPTION OF THE EMBODIMENTS

Phthalocyanine pigments have an excellent function as a photoconductor, but higher sensitivity has been required with an increasing market demand in some uses. In particular, among such phthalocyanine pigments, chlorogallium phthalocyanine crystals are used, for example, as a charge generation material for electrophotographic photosensitive members. However, phthalocyanine pigments need to have higher sensitivity than before with the recent realization of high-speed electrophotographic apparatuses (high-speed processing).

Accordingly, the present invention provides a chlorogallium phthalocyanine crystal having high sensitivity and a method for producing the chlorogallium phthalocyanine crystal, an electrophotographic photosensitive member that uses the chlorogallium phthalocyanine crystal, and a process cartridge and an electrophotographic apparatus that use the electrophotographic photosensitive member.

In an embodiment of the present invention, the chlorogallium phthalocyanine crystal is obtained by mixing a hydroxygallium phthalocyanine crystal with an aqueous hydrochloric acid solution. The mixing can be performed by a milling treatment or a stirring treatment.

As a result of studies conducted by the present inventors on a chlorogallium phthalocyanine crystal produced by the above particular production method, it has been found that such a chlorogallium phthalocyanine crystal has an excellent function as a photoconductor and is useful as a material for electrophotographic photosensitive members, solar batteries, sensors, switching elements, and the like. It has been particularly found that when the chlorogallium phthalocyanine crystal is used as a material for an electrophotographic photosensitive member, the chlorogallium phthalocyanine crystal has absorption characteristics that achieve high sensitivity of the electrophotographic photosensitive member.

The present inventors have studied the reason for which a chlorogallium phthalocyanine crystal having high sensitivity is obtained by the particular production method. Consequently, a typically used analytical method for identifying a crystal form, such as X-ray diffraction, sometimes does not differentiate the above-described chlorogallium phthalocyanine crystal and a publicly known chlorogallium phthalocyanine crystal. However, there is a distinct difference in sensitivity between the chlorogallium phthalocyanine crystal produced by the particular production method and a chlorogallium phthalocyanine crystal produced by a method other than the particular production method. For example, among chlorogallium phthalocyanine crystals having peaks at the same positions in CuKα X-ray diffraction, the chlorogallium phthalocyanine crystal produced by the particular production method has higher sensitivity than the chlorogallium phthalocyanine crystal produced by a method other than the particular production method. Although the reason for this is still unclear, the present inventors assume that in the chlorogallium phthalocyanine crystal produced by the particular production method, J aggregates that tend to generate carriers and H aggregates that tend to cause the generated carriers to flow form a crystal in such a desired state that the amount of carriers generated from the crystal increases (there is currently no specific method for verifying this phenomenon).

The chlorogallium phthalocyanine crystal according to an embodiment of the present invention, that is, the chlorogallium phthalocyanine crystal obtained by mixing a hydroxygallium phthalocyanine crystal and an aqueous hydrochloric acid solution is, for example, a chlorogallium phthalocyanine crystal having peaks at Bragg angles 2θ of 7.1°±0.2°, 16.5°±0.2°, 25.8°±0.2°, and 28.2°±0.2° in a CuKα X-ray diffraction pattern. In an embodiment of the present invention, the X-ray diffraction of the phthalocyanine crystal is measured by powder X-ray diffractometry under the following conditions.

Measurement instrument used: X-ray diffractometer RINT-TTR II manufactured by Rigaku Corporation
X-ray tube: Cu
Tube voltage: 50 kV
Tube current: 300 mA
Scanning mode: 2θ/θ scan
Scanning speed: 4.0°/min
Sampling step size: 0.02°
Start angle (2θ): 5.0°
Stop angle (2θ): 40.0°
Attachment: standard sample holder
Filter: nonuse
Incidence monochromator: use
Counter monochromator: nonuse
Divergence slit: open
Divergence vertical limitation slit: 10.00 mm
Scattering slit: open
Receiving slit: open
Counter: scintillation counter
Hydrochloric acid treatment step
Hydroxygallium phthalocyanine crystal The hydroxygallium phthalocyanine crystal serving as a raw material is, for example, a crystal having peaks at Bragg angles 2θ of 6.9°±0.2° and 26.4°±0.2° in a CuKα X-ray diffraction pattern in view of reactivity with the aqueous hydrochloric acid solution.

For example, the hydroxygallium phthalocyanine crystal is obtained through a step of performing an acid pasting treatment on a chlorogallium phthalocyanine crystal (raw material) having peaks at Bragg angles 2θ of 7.1°±0.2°, 16.5°±0.2°, 25.8°±0.2°, and 28.2°±0.2° in a CuKα X-ray diffraction pattern. In other words, the acid pasting treatment is performed before the hydrochloric acid treatment step. Furthermore, for example, the raw material chlorogallium phthalocyanine crystal has peaks at Bragg angles 2θ of 7.1°±0.2°, 16.5°±0.2°, 25.8°±0.2°, and 28.2°±0.2° and does not have peaks at 27.2°±0.4° in a CuKα X-ray diffraction pattern.

The acid used in the acid pasting treatment is preferably sulfuric acid and more preferably concentrated sulfuric acid.
Aqueous Hydrochloric Acid Solution In the hydrochloric acid treatment step, the concentration of the aqueous hydrochloric acid solution mixed with the hydroxygallium phthalocyanine crystal is preferably 10 mass % or more and more preferably 30 mass % or more in view of reactivity.

In the hydrochloric acid treatment step, the amount of hydrochloric acid mixed with the hydroxygallium phthalocyanine crystal is preferably 10 mol or more and more preferably 100 mol or more based on 1 mol of the hydroxygallium phthalocyanine crystal used.
Wet Milling Step After the hydrochloric acid treatment step, a wet milling step of mixing the obtained chlorogallium phthalocyanine crystal and an organic compound and performing a wet milling treatment may be further conducted. Through this wet milling step, the organic compound is taken into the chlorogallium phthalocyanine crystal and thus a chlorogallium phthalocyanine crystal in which the organic compound is contained can be obtained. Such a chlorogallium phthalocyanine crystal is desired in terms of increase in sensitivity because the amount of carriers generated from the crystal increases. In an embodiment of the present invention, the "wet milling treatment" is a treatment performed using a milling apparatus such as a sand mill, a ball mill, or a paint shaker or a stirring apparatus such as a homogenizer, a mixing impeller, or a magnetic stirrer. The milling treatment time is, for example, 1 to 100 hours.
Organic Compound Examples of the organic compound used in the wet milling step include amide solvents such as formamide, N,N-dimethylformamide, N,N-dimethylacetamide, N-methylformamide, N-methylacetamide, N-methylpropionamide, and N-methyl-2-pyrrolidone; halogen solvents such as chloroform; ether solvents such as tetrahydrofuran; sulfoxide solvents such as dimethyl sulfoxide; and ketone solvents such as acetone.

The amount of the organic compound used in the wet milling step is, for example, 5 to 30 times the amount of the chlorogallium phthalocyanine crystal used on a mass basis. The content of the organic compound taken into the crystal after the wet milling step is preferably 0.1 mass % or more and 1.5 mass % or less and more preferably 0.10 mass % or more and 0.80 mass % or less based on the content of the chlorogallium phthalocyanine crystal.

Next, the case where the above-described chlorogallium phthalocyanine crystal according to an embodiment of the present invention is used as a charge generation material for an electrophotographic photosensitive member will be described.
Electrophotographic Photosensitive Member An electrophotographic photosensitive member according to an embodiment of the present invention includes a support and a photosensitive layer. The photosensitive layer may be a single-layer type photosensitive layer containing both a charge transport material and a charge generation material or a multilayer type (function-separated) photosensitive layer separately including a charge generating layer containing a charge generation material and a charge transporting layer containing a charge transport material. In view of electrophotographic characteristics, an electrophotographic photosensitive member including a support, a charge generating layer, and a charge transporting layer in this order is particularly used.

Figure 9A:
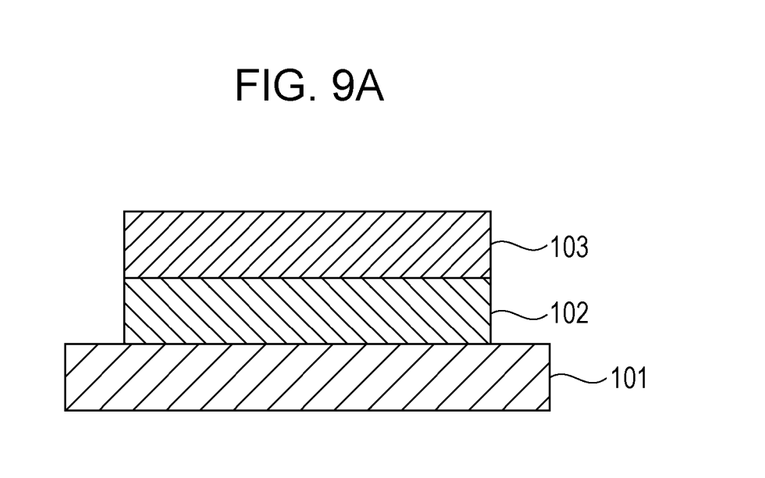
FIGS. 9A and 9B illustrate examples of layer structures of an electrophotographic photosensitive member.
Figure 9B:
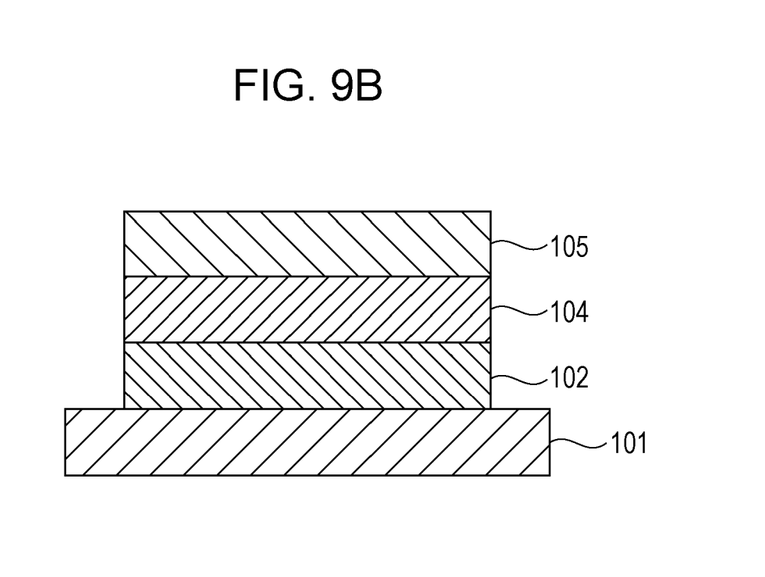

FIGS. 9A and 9B illustrate examples of layer structures of the electrophotographic photosensitive member. FIG. 9A illustrates a single-layer type photosensitive layer in which an undercoat layer 102 is formed on a support 101 and a photosensitive layer 103 is formed on the undercoat layer 102. FIG. 9B illustrates a multilayer type photosensitive layer in which an undercoat layer 102 is formed on a support 101, a charge generating layer 104 is formed on the undercoat layer 102, and a charge transporting layer 105 is formed on the charge generating layer 104.

Support

The support is, for example, a conductive support having electrical conductivity. The support may be, for example, a support made of a metal or an alloy such as aluminum or stainless steel. The support may also be a metal support, a plastic support, or a paper support whose surface is coated with a conductive film. The shape of the support is, for example, a cylindrical shape or a film-like shape.

An undercoat layer or a conductive layer may be disposed between the support and the photosensitive layer.

Conductive Layer

A conductive layer may be disposed between the support and an undercoat layer described below in order to cover unevenness on the surface of the support and suppress interference fringes. The conductive layer can be formed by forming a coating film of a conductive layer-forming coating liquid prepared by dispersing conductive particles, a binder resin, and a solvent and then drying the coating film. The thickness of the conductive layer is preferably 5 to 40 μm and more preferably 10 to 30 μm.

Examples of the conductive particles used in the conductive layer include aluminum particles, titanium oxide particles, tin oxide particles, zinc oxide particles, carbon black, and silver particles. Examples of the binder resin include polyester, polycarbonate, polyvinyl butyral, acrylic resin, silicone resin, epoxy resin, melamine resin, urethane resin, phenolic resin, and alkyd resin. Examples of the solvent for the conductive layer-forming coating liquid include ether solvents, alcohol solvents, ketone solvents, and aromatic hydrocarbon solvents.

Undercoat Layer

An undercoat layer (also referred to as an intermediate layer) having a barrier function and an adhesive function may also be disposed so as to be adjacent to the surface of the photosensitive layer on the support side. The undercoat layer can be formed by forming a coating film of an undercoat layer-forming coating solution prepared by mixing a binder resin and a solvent and drying the coating film. The thickness of the undercoat layer is preferably 0.1 to 10 μm and more preferably 0.3 to 5.0 μm.

Examples of the binder resin used in the undercoat layer include polyvinyl alcohol, polyethylene oxide, ethyl cellulose, methyl cellulose, casein, polyamide, glue, and gelatin.

Photosensitive Layer (1) Single-Layer Type Photosensitive Layer

When the photosensitive layer is a single-layer type photosensitive layer, the photosensitive layer contains the chlorogallium phthalocyanine crystal according to an embodiment of the present invention as a charge generation material. The photosensitive layer can be formed by forming a coating film of a photosensitive layer-forming coating solution prepared by mixing the chlorogallium phthalocyanine crystal according to an embodiment of the present invention, a charge transport material, and a binder resin in a solvent and drying the coating film. The charge transport material and the binder resin are the same as those exemplified in "(2) Multilayer type photosensitive layer" described below.

(2) Multilayer Type Photosensitive Layer

When the photosensitive layer is a multilayer type photosensitive layer, the photosensitive layer includes a charge generating layer and a charge transporting layer.

(2-1) Charge Generating Layer

The charge generating layer contains the chlorogallium phthalocyanine crystal according to an embodiment of the present invention as a charge generation material. The charge generating layer can be formed by forming a coating film of a charge generating layer-forming coating solution prepared by mixing the chlorogallium phthalocyanine crystal and a binder resin in a solvent and then drying the coating film. The thickness of the charge generating layer is preferably 0.05 to 1 μm and more preferably 0.1 to 0.3 μm.

The content of the charge generation material in the charge generating layer is preferably 30 mass % or more and 90 mass % or less and more preferably 50 mass % or more and 80 mass % or less based on the total mass of the charge generating layer.

Materials other than the chlorogallium phthalocyanine crystal according to an embodiment of the present invention may also be used in combination as the charge generation material. In this case, the content of the chlorogallium phthalocyanine crystal according to an embodiment of the present invention is preferably 50 mass % or more based on the total mass of the charge generation material.

Examples of the binder resin used for the charge generating layer include polyester, acrylic resin, phenoxy resin, polycarbonate, polyvinyl butyral, polystyrene, polyvinyl acetate, polysulfone, polyarylate, vinylidene chloride, acrylonitrile copolymers, and polyvinyl benzal. Among them, polyvinyl butyral and polyvinyl benzal are particularly used.

(2-2) Charge Transporting Layer

The charge transporting layer can be formed by forming a coating film of a charge transporting layer-forming coating solution prepared by dissolving a charge transport material and a binder resin in a solvent and drying the coating film. The thickness of the charge transporting layer is preferably 5 to 40 μm and more preferably 10 to 25 μm.

Examples of the charge transport material include triarylamine compounds, hydrazone compounds, stilbene compounds, pyrazoline compounds, oxazole compounds, thiazole compounds, and triallylmethane compounds. Among them, a triarylamine compound is particularly used.

Examples of the binder resin used for the charge transporting layer include polyester, acrylic resin, phenoxy resin, polycarbonate, polystyrene, polyvinyl acetate, polyvinyl butyral, polyarylate, vinylidene chloride, and acrylonitrile copolymers. Among them, polycarbonate and polyarylate are particularly used.

The content of the charge transport material in the charge transporting layer is preferably 20 mass % or more and 80 mass % or less and more preferably 30 mass % or more and 60 mass % or less based on the total mass of the charge transporting layer.

Protective Layer

A protective layer may be disposed on a surface of the photosensitive layer, the surface being located opposite the support, in order to protect the photosensitive layer. The protective layer can be formed by forming a coating film of a protective layer-forming coating solution prepared by dissolving a binder resin in a solvent and drying the coating film. Examples of the binder resin used for the protective layer include polyvinyl butyral, polyester, polycarbonate, nylon, polyimide, polyarylate, polyurethane, styrene-butadiene copolymers, styrene-acrylic acid copolymers, and styrene-acrylonitrile copolymers. The thickness of the protective layer is, for example, 0.05 to 20 μm.

To provide charge transportability to the protective layer, the protective layer may be formed by curing a monomer having charge transportability (hole transportability) through a polymerization reaction or a cross-linking reaction. Specifically, the protective layer can be formed by curing a charge transporting compound (hole transporting compound) having a chain-polymerizable functional group through polymerization or cross-linking.

Examples of a method for applying the coating solutions for the above-described layers include dipping, spray coating, spinner coating, bead coating, blade coating, and beam coating.

Surface Layer

The surface layer of the electrophotographic photosensitive member may contain conductive particles, an ultraviolet absorber, and lubricant particles such as fluorine-containing resin particles. The conductive particles are, for example, metal oxide particles such as tin oxide particles.

Process Cartridge and Electrophotographic Apparatus

A process cartridge according to an embodiment of the present invention integrally supports the above-described electrophotographic photosensitive member and at least one selected from a charging device, a developing device, a transfer device, and a cleaning member and is detachably attachable to a main body of an electrophotographic apparatus.

An electrophotographic apparatus according to an embodiment of the present invention includes the above-described electrophotographic photosensitive member, a charging device, an exposure device, a developing device, and a transfer device.

Figure 8:
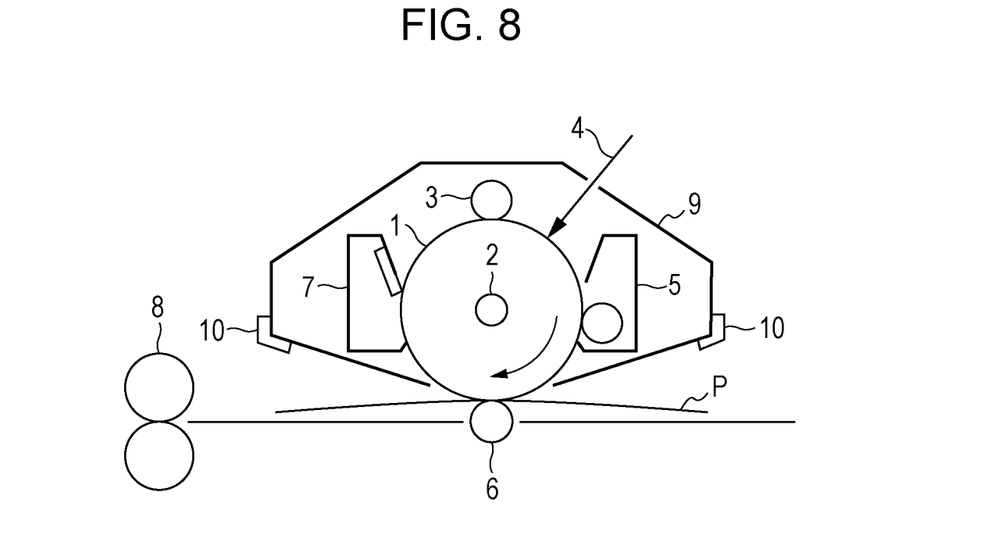
FIG. 8 illustrates an example of a schematic structure of an electrophotographic apparatus that includes a process cartridge including an electrophotographic photosensitive member.

FIG. 8 illustrates an example of a schematic structure of an electrophotographic apparatus that includes a process cartridge including an electrophotographic photosensitive member.

A cylindrical (drum-shaped) electrophotographic photosensitive member 1 is rotated about a shaft 2 at a predetermined peripheral speed (process speed) in a direction indicated by an arrow.

In the rotation, the surface (peripheral surface) of the electrophotographic photosensitive member 1 is charged at a predetermined positive or negative potential by a charging device (primary charging device) 3. The surface of the electrophotographic photosensitive member 1 is then irradiated with exposure light (image exposure light) 4 emitted from an exposure device (image exposure device, not illustrated). Thus, an electrostatic latent image corresponding to intended image information is formed on the surface of the electrophotographic photosensitive member 1. The exposure light 4 is, for example, intensity-modulated light emitted from an exposure device such as a slit exposure device or a laser beam scanning exposure device, in response to the time-series electric digital image signals of the intended image information.

The electrostatic latent image formed on the surface of the electrophotographic photosensitive member 1 is subjected to development (normal or reversal development) with a developing agent (toner) contained in a developing device 5, and thus a toner image is formed on the surface of the electrophotographic photosensitive member 1. The toner image formed on the surface of the electrophotographic photosensitive member 1 is transferred onto a transfer material P by a transfer device 6. Herein, a voltage (transfer bias) having polarity opposite to the polarity of the electric charge of the toner is applied to the transfer device 6 from a bias power supply (not illustrated). The transfer material P is fed to a portion between the electrophotographic photosensitive member 1 and the transfer device 6 from a transfer material feeding device (not illustrated) in synchronism with the rotation of the electrophotographic photosensitive member 1.

The transfer material P onto which the toner image has been transferred is separated from the surface of the electrophotographic photosensitive member 1 and is conveyed to a fixing device 8. After the toner image is fixed, the transfer material P is output from the electrophotographic apparatus as an image-formed article (a print or a copy).

The surface of the electrophotographic photosensitive member 1 after the toner image has been transferred onto the transfer material P is cleaned by removing deposits such as a residual developing agent (residual toner) with a cleaning member 7. Such a residual toner can also be collected by a developing device or the like (cleanerless system).

Furthermore, the surface of the electrophotographic photosensitive member 1 is irradiated with pre-exposure light (not illustrated) from a pre-exposure device (not illustrated) to remove electricity, and then the electrophotographic photosensitive member 1 is repeatedly used for image forming. In the case where the charging device 3 is a contact charging device that uses a charging roller or the like as illustrated in FIG. 8, the pre-exposure device is not necessarily required.

A plurality of components selected from the components such as the electrophotographic photosensitive member 1, the charging device 3, the developing device 5, the transfer device 6, and the cleaning member 7 may be incorporated in a container and integrally supported to provide a process cartridge. The process cartridge may be detachably attachable to the main body of an electrophotographic apparatus. For example, the electrophotographic photosensitive member 1 and at least one selected from the charging device 3, the developing device 5, the transfer device 6, and the cleaning member 7 are integrally supported to provide a process cartridge 9, which is detachably attachable to the main body of an electrophotographic apparatus using a guide unit 10 such as a rail of the main body.

In the case where the electrophotographic apparatus is a copying machine or a printer, the exposure light 4 may be reflected light from a document or transmitted light. Alternatively, the exposure light 4 may be light applied by, for example, scanning with a laser beam according to signals into which a document read by a sensor is converted, driving of an LED array, or driving of a liquid-crystal shutter array.

EXAMPLES

Hereafter, the present invention will be further described in detail based on specific examples, but is not limited thereto. "Part" used below means "part by mass". The thickness of each layer of electrophotographic photosensitive members in Examples and Comparative Examples was determined by using an eddy current thickness meter (Fischerscope, manufactured by Fischer Instruments) or by conversion from the mass per unit area using specific gravity.

Synthesis Example

After 36.7 parts of orthophthalonitrile, 25 parts of gallium trichloride, and 300 parts of α-chloronaphthalene were reacted with each other in a nitrogen atmosphere at 200° C. for 5.5 hours, the resulting product was filtered at 130° C. The product was washed by dispersion using N,N-dimethylformamide at 140° C. for 2 hours and then filtered. The filter residue was washed with methanol and dried to obtain 46 parts of chlorogallium phthalocyanine. The chlorogallium phthalocyanine was a crystal having peaks at Bragg angles 2θ of 7.4°, 16.6°, 25.5°, and 28.3° in a CuKα X-ray diffraction pattern.

Example 1-1

Figure 1:
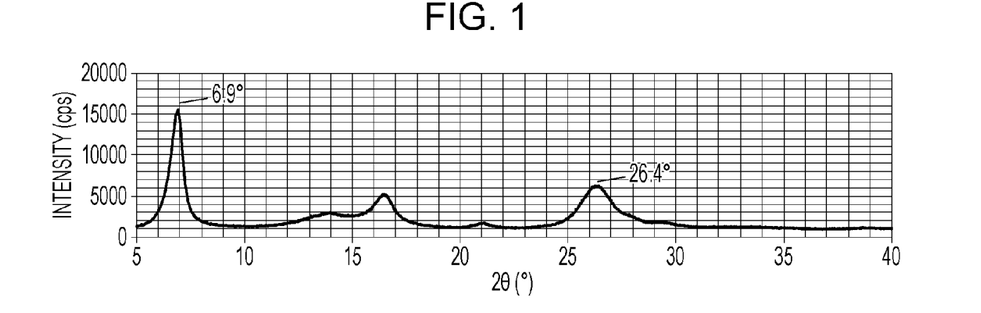
FIG. 1 illustrates an X-ray diffraction pattern of a hydroxygallium phthalocyanine crystal obtained in Example 1-1.

Twenty-four parts of the chlorogallium phthalocyanine obtained in Synthesis Example was dissolved in 750 parts of concentrated sulfuric acid at 5° C. The mixture was dropped into 2500 parts of ice water under stirring to perform reprecipitation (acid pasting treatment), and filtration was performed under reduced pressure. Herein, No. 5C (manufactured by ADVANTEC Co., Ltd.) was used as the filter. Subsequently, the filter residue was washed by dispersion using 2% ammonia water for 30 minutes, and then washed by dispersion using ion-exchanged water four times. Finally, freeze drying was performed and thus a hydroxygallium phthalocyanine crystal was obtained at a yield of 97%. The hydroxygallium phthalocyanine crystal was a crystal having peaks at Bragg angles 2θ of 6.9° and 26.4° in a CuKα X-ray diffraction pattern. FIG. 1 illustrates the measurement result (X-ray diffraction pattern) of the crystal form.

Figure 2:
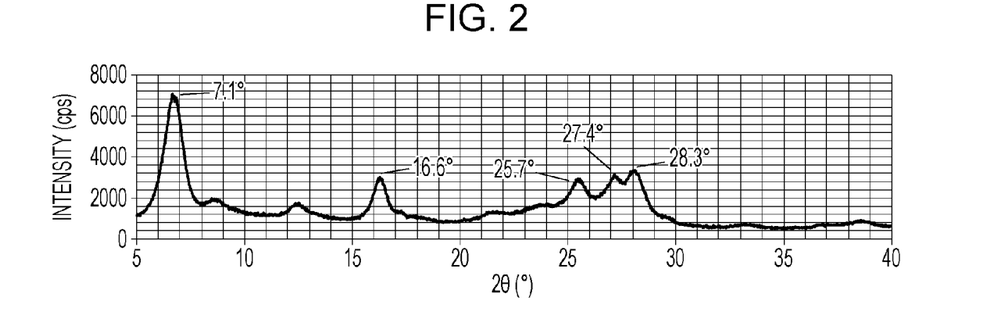
FIG. 2 illustrates an X-ray diffraction pattern of a chlorogallium phthalocyanine crystal obtained in Example 1-1.
Figure 3:
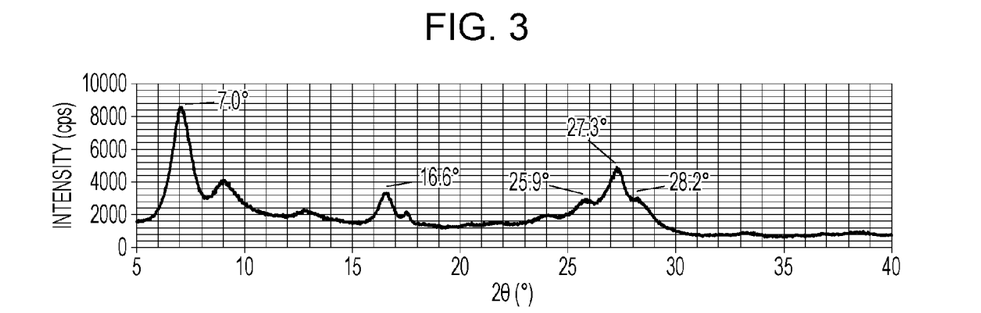
FIG. 3 illustrates an X-ray diffraction pattern of a chlorogallium phthalocyanine crystal obtained in Example 1-6.
Figure 4:
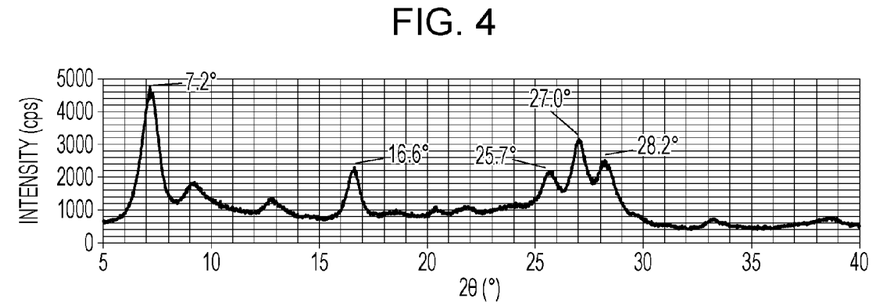
FIG. 4 illustrates an X-ray diffraction pattern of a chlorogallium phthalocyanine crystal obtained in Example 1-9.
Figure 5:
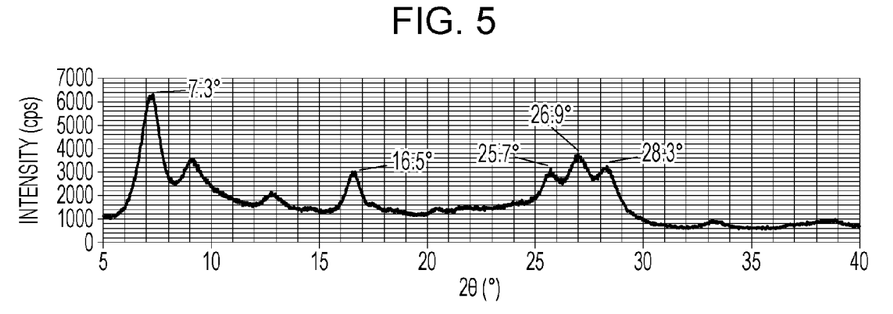
FIG. 5 illustrates an X-ray diffraction pattern of a chlorogallium phthalocyanine crystal obtained in Example 1-12.
Figure 6:
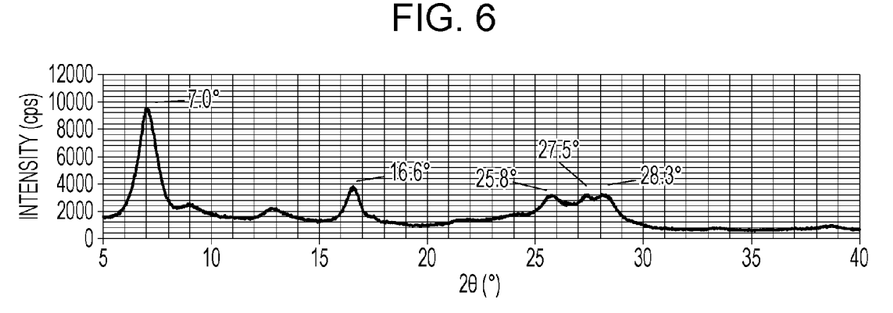
FIG. 6 illustrates an X-ray diffraction pattern of a chlorogallium phthalocyanine crystal obtained in Example 1-13.

Ten parts of the hydroxygallium phthalocyanine crystal and 200 parts of an aqueous hydrochloric acid solution at 23° C. with a concentration of 35 mass % were mixed with each other and stirred using a magnetic stirrer for 90 minutes. After the stirring, the mixture was dropped into 1000 parts of ion-exchanged water (0° C.) cooled with ice water, and stirred using a magnetic stirrer for 30 minutes. Filtration was performed under reduced pressure. Herein, No. 5C (manufactured by ADVANTEC Co., Ltd.) was used as the filter. Subsequently, the filter residue was washed by dispersion using ion-exchanged water at 23° C. four times. Thus, 9 parts of a chlorogallium phthalocyanine crystal was obtained. The chlorogallium phthalocyanine crystal was a crystal having peaks at Bragg angles 2θ of 7.1°, 16.6°, 25.7°, 27.4°, and 28.3° in a CuKα X-ray diffraction pattern. FIG. 2 illustrates the measurement result (X-ray diffraction pattern) of the crystal form.

Examples 1-2 to 1-11

Chlorogallium phthalocyanine crystals were produced in the same manner as in Example 1-1, except that the mixing conditions of the aqueous hydrochloric acid solution and the subsequent treatment were changed to those listed in Table 1.

In Table 1, the term "water temperature (° C.) during washing by dispersion" refers to a water temperature of the ion-exchanged water used when washing by dispersion was performed.

Example 1-12

A chlorogallium phthalocyanine crystal was obtained in the same manner as in Example 1-1, except that 30 parts of glass beads having a diameter of 1 mm were added to the hydroxygallium phthalocyanine crystal and the aqueous hydrochloric acid solution and mixing was performed using a paint shaker for 24 hours.

Example 1-13

A chlorogallium phthalocyanine crystal was obtained in the same manner as in Example 1-1, except that after the hydroxygallium phthalocyanine crystal and the aqueous hydrochloric acid solution were mixed with each other, the filter residue left on the filter during the first filtration under reduced pressure was neutralized with 20 parts of 2% ammonia water.

Example 1-14

A chlorogallium phthalocyanine crystal was obtained in the same manner as in Example 1-12, except that the hydroxygallium phthalocyanine crystal mixed with the aqueous hydrochloric acid solution was changed to a hydroxygallium phthalocyanine crystal having peaks at Bragg angles 2θ of 7.4°±0.3° and 28.3°±0.3° in a CuKα X-ray diffraction pattern.

Example 1-15

At room temperature (23° C.), 0.5 parts of the chlorogallium phthalocyanine crystal obtained in Example 1-1, 10

TABLE 1

| | Treatment conditions | | | | | | | |
|---|---|---|---|---|---|---|---|---|
| | Aqueous hydrochloric acid solution | | | | Ion-exchanged water | | | Water temperature during |
| Example No. | Amount of aqueous hydrochloric acid solution used (Part) | Concentration of aqueous hydrochloric acid solution (mass %) | Temperature during mixing (° C.) | Amount of hydrochloric acid used based on 1 mol of crystal (mol) | Amount (Part) | Temperature (° C.) | Stirring time (minute) | washing by dispersion (° C.) |
| Example 1-1 | 200 | 35 | 23 | 115 | 1000 | 0 | 30 | 23 |
| Example 1-2 | 1000 | 35 | 23 | 573 | 1000 | 0 | 30 | 23 |
| Example 1-3 | 100 | 35 | 23 | 57 | 1000 | 0 | 30 | 23 |
| Example 1-4 | 200 | 35 | 0 | 115 | 1000 | 0 | 30 | 23 |
| Example 1-5 | 200 | 35 | 80 | 115 | 1000 | 0 | 30 | 23 |
| Example 1-6 | 200 | 35 | 23 | 115 | 5000 | 0 | 30 | 23 |
| Example 1-7 | 200 | 35 | 23 | 115 | 1000 | 80 | 30 | 23 |
| Example 1-8 | 200 | 35 | 23 | 115 | 5000 | 80 | 30 | 23 |
| Example 1-9 | 200 | 35 | 23 | 115 | 5000 | 80 | 30 | 80 |
| Example 1-10 | 200 | 35 | 23 | 115 | 1000 | 0 | 90 | 23 |
| Example 1-11 | 700 | 10 | 80 | 115 | 1000 | 0 | 30 | 23 | parts of N,N-dimethylformamide, and 15 parts of glass beads having a diameter of 1 mm were subjected to a milling treatment for 24 hours using a ball mill. A chlorogallium phthalocyanine crystal was extracted from the resulting dispersion liquid using tetrahydrofuran and filtered, and the resulting filter residue on the filter was thoroughly washed using tetrahydrofuran. The filter residue was vacuum-dried to obtain 0.43 parts of a chlorogallium phthalocyanine crystal.

Comparative Example 1-1

A chlorogallium phthalocyanine crystal was obtained by performing mixing with the aqueous hydrochloric acid solution in the same manner as in Example 1-1, except that the hydroxygallium phthalocyanine crystal having peaks at Bragg angles 2θ of 6.9° and 26.4° in CuKα X-ray diffraction was changed to the chlorogallium phthalocyanine crystal obtained in Synthesis Example, and the acid pasting treatment was omitted. The resulting chlorogallium phthalocyanine crystal was a crystal having peaks at Bragg angles 2θ of 7.4°, 16.6°, 25.5°, and 28.3° in a CuKα X-ray diffraction pattern.

Comparative Example 1-2

The same process as in Example 1-1 was performed, except that the aqueous hydrochloric acid solution mixed with the hydroxygallium phthalocyanine crystal having peaks at Bragg angles 2θ of 6.9° and 26.4° in CuKα X-ray diffraction was changed to concentrated sulfuric acid. As a result, a hydroxygallium phthalocyanine crystal was obtained.

Example 2-1

An aluminum cylinder (JIS-A3003, aluminum alloy) having a diameter of 24 mm and a length of 257.5 mm was used as a support (conductive support).

Subsequently, 60 parts of barium sulfate particles coated with tin oxide (trade name: Passtran PC1, manufactured by MITSUI MINING & SMELTING Co., Ltd.), 15 parts of titanium oxide particles (trade name: TITANIX JR, manufactured by TAYCA CORPORATION), 43 parts of resole phenolic resin (trade name: Phenolite J-325, manufactured by DIC Corporation, solid content: 70 mass %), 0.015 parts of silicone oil (trade name: SH28PA, manufactured by Dow Corning Toray Co., Ltd.), 3.6 parts of silicone resin particles (trade name: Tospearl 120, manufactured by Toshiba Silicone Co., Ltd.), 50 parts of 2-methoxy-1-propanol, and 50 parts of methanol were inserted into a ball mill and dispersed for 20 hours to prepare a conductive layer-forming coating liquid. The conductive layer-forming coating liquid was applied onto the support by dipping to form a coating film. The coating film was cured by performing heating at 140° C. for 1 hour to form a conductive layer having a thickness of 15 μm.

Subsequently, 10 parts of copolymer nylon (trade name: Amilan CM8000, manufactured by Toray Industries, Inc.) and 30 parts of methoxymethylated 6 nylon (trade name: Toresin EF-30T, manufactured by Teikoku Chemical Industries Co., Ltd.) were dissolved in a mixed solvent of methanol 400 parts/n-butanol 200 parts to prepare an undercoat layer-forming coating solution. The undercoat layer-forming coating solution was applied onto the conductive layer by dipping to form a coating film. The coating film was dried at 80° C. for 6 minutes to form an undercoat layer having a thickness of 0.42 μm.

Subsequently, 2 parts of the chlorogallium phthalocyanine crystal (charge generation material) obtained in Example 1-1, 1 part of polyvinyl butyral (trade name: S-LEC BX-1, manufactured by SEKISUI CHEMICAL CO., LTD.), and 52 parts of cyclohexanone were inserted into a sand mill that uses glass beads having a diameter of 1 mm and dispersed for 6 hours. Then, 75 parts of ethyl acetate was added thereto to prepare a charge generating layer-forming coating solution. The charge generating layer-forming coating solution was applied onto the undercoat layer by dipping to form a coating film. The coating film was dried at 100° C. for 10 minutes to form a charge generating layer having a thickness of 0.20 μm.

Subsequently, 28 parts of a compound represented by formula (C-1) below (charge transport material (hole transport compound)), (C-1)

4 parts of a compound represented by formula (C-2) below (charge transport material (hole transport compound)), and (C-2)

40 parts of polycarbonate (trade name: Iupilon 2200, manufactured by Mitsubishi Engineering-Plastics Corporation) were dissolved in a mixed solvent of monochlorobenzene 200 parts/dimethoxymethane 50 parts to prepare a charge transporting layer-forming coating solution. The charge transporting layer-forming coating solution was applied onto the charge generating layer by dipping to form a coating film. The coating film was dried at 120° C. for 30 minutes to form a charge transporting layer having a thickness of 18 μm.

Thus, a cylindrical (drum-shaped) electrophotographic photosensitive member of Example 2-1 was produced.

Examples 2-2 to 2-16 and Comparative Examples 2-1 to 2-3

Electrophotographic photosensitive members were produced in the same manner as in Example 2-1, except that the chlorogallium phthalocyanine crystal obtained in Example 1-1 was changed to that listed in Table 2.

Evaluation of Sensitivity of Electrophotographic Photosensitive Member

Figure 7:
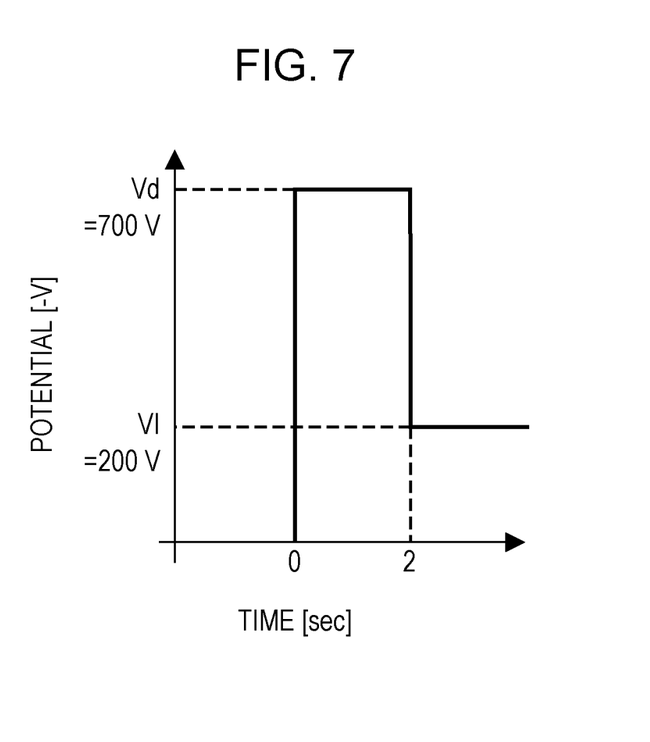
FIG. 7 is a diagram describing the evaluation of sensitivity of an electrophotographic photosensitive member.

The sensitivity was evaluated using the produced electrophotographic photosensitive members. The sensitivity was measured by measuring the electrophotographic characteristics of each of the produced electrophotographic photosensitive members with a direct voltage application-type electrophotographic photosensitive member measuring apparatus that uses curved NESA glass. Specifically, first, in order to remove the hysteresis of the electrophotographic photosensitive member (hysteresis of potential), the entire surface of the electrophotographic photosensitive member was irradiated with light having a particular light amount (1 µJ/cm$^2$). Ten milliseconds after the irradiation, the surface of the electrophotographic photosensitive member was charged in a dark place so that the surface of the electrophotographic photosensitive member had a particular potential (Vd: −700 V). In the dark place, the surface of the electrophotographic photosensitive member was exposed two seconds after the charging so that the potential (Vl) after the exposure was −200 V, and the exposure amount (µJ/cm$^2$) was evaluated as the sensitivity. The smaller the exposure amount, the higher the sensitivity of the electrophotographic photosensitive member. When the exposure amount was 0.500 µJ/cm$^2$ or less, the effects of the present invention were judged to be achieved. FIG. 7 illustrates a change in the potential of the surface of the electrophotographic photosensitive member in this evaluation.

TABLE 2

Production condition and Evaluation result

| Example No. | Production condition Crystal used | Evaluation result Exposure amount (µJ/cm$^2$) |
|---|---|---|
| Example 2-1 | Example 1-1 | 0.356 |
| Example 2-2 | Example 1-2 | 0.350 |
| Example 2-3 | Example 1-3 | 0.371 |
| Example 2-4 | Example 1-4 | 0.361 |
| Example 2-5 | Example 1-5 | 0.349 |
| Example 2-6 | Example 1-6 | 0.373 |
| Example 2-7 | Example 1-7 | 0.354 |
| Example 2-8 | Example 1-8 | 0.386 |
| Example 2-9 | Example 1-9 | 0.372 |
| Example 2-10 | Example 1-10 | 0.360 |
| Example 2-11 | Example 1-11 | 0.360 |
| Example 2-12 | Example 1-12 | 0.365 |
| Example 2-13 | Example 1-13 | 0.371 |
| Example 2-14 | Example 1-14 | 0.460 |
| Example 2-15 | Example 1-15 | 0.179 |
| Comparative Example 2-1 | Comparative Example 1-1 | 0.513 |
| Comparative Example 2-2 | Comparative Example 1-2 | 0.697 |
| Comparative Example 2-3 | Synthesis Example | Not charged |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for producing a chlorogallium phthalocyanine crystal, the method comprising:
   a hydrochloric acid treatment step of obtaining a chlorogallium phthalocyanine crystal by mixing a hydroxygallium phthalocyanine crystal and an aqueous hydrochloric acid solution,
   wherein concentration of the aqueous hydrochloric acid solution is 10 mass % or more.

2. The method according to claim 1, wherein the chlorogallium phthalocyanine crystal is a crystal having peaks at Bragg angles 2θ of 7.1°±0.2°, 16.5°±0.2°, 25.8°±0.2°, 27.2°±0.4°, and 28.2°±0.2° in a CuKα X-ray diffraction pattern.

3. The method according to claim 1, the method further comprising, before the hydrochloric acid treatment step, a step of obtaining the hydroxygallium phthalocyanine crystal by performing an acid pasting treatment on a chlorogallium phthalocyanine crystal (a raw material).

4. The method according to claim 1, the method further comprising, after the hydrochloric acid treatment step, a step of mixing the chlorogallium phthalocyanine crystal and an organic compound and performing a wet milling treatment to obtain a chlorogallium phthalocyanine crystal in which the organic compound is comprised.

5. A method for producing an electrophotographic photosensitive member that includes, in the following order, a support and a photosensitive layer having a chlorogallium phthalocyanine crystal the method comprising:
   a hydrochloric acid treatment step of obtaining the chlorogallium phthalocyanine crystal by mixing a hydroxygallium phthalocyanine crystal and an aqueous hydrochloric acid solution,
   wherein concentration of the aqueous hydrochloric acid solution is 10 mass % or more.

6. A method for producing an electrophotographic photosensitive member that includes, in the following order, a support, a charge generating layer having a chlorogallium phthalocyanine crystal, and a charge transporting layer, the method comprising:
   a hydrochloric acid treatment step of obtaining the chlorogallium phthalocyanine crystal by mixing a hydroxygallium phthalocyanine crystal and an aqueous hydrochloric acid solution,
   wherein concentration of the aqueous hydrochloric acid solution is 10 mass % or more.

* * * * *